US008025409B2

(12) United States Patent
Kawamura et al.

(10) Patent No.: US 8,025,409 B2
(45) Date of Patent: Sep. 27, 2011

(54) OPTICAL APPARATUS AND PROJECTION DISPLAY SYSTEM

(75) Inventors: Nao Kawamura, Aichi (JP); Nobuhiko Nishiki, Kanagawa (JP); Hideki Katsuragawa, Tokyo (JP); Masayuki Shimizu, Kanagawa (JP); Takuya Hasegawa, Kanagawa (JP)

(73) Assignee: Sony Corporation (JP)

( * ) Notice: Subject to any disclaimer, the term of this patent is extended or adjusted under 35 U.S.C. 154(b) by 552 days.

(21) Appl. No.: 12/011,980

(22) Filed: Jan. 30, 2008

(65) Prior Publication Data

US 2009/0027623 A1 Jan. 29, 2009

(30) Foreign Application Priority Data

Jan. 31, 2007 (JP) ................ P2007-020612
May 24, 2007 (JP) ................ P2007-138021

(51) Int. Cl.
*G03B 21/14* (2006.01)
*G03B 21/00* (2006.01)
*G02B 15/16* (2006.01)

(52) U.S. Cl. .......... 353/31; 353/33; 353/84; 349/8; 359/892

(58) Field of Classification Search .......... 353/20, 353/30, 31, 33, 84; 349/5, 8; 359/885, 892
See application file for complete search history.

(56) References Cited

U.S. PATENT DOCUMENTS

| | | | |
|---|---|---|---|
| 5,917,561 A | 6/1999 | Hatanaka | |
| 6,183,093 B1 * | 2/2001 | Sawai | 353/31 |
| 6,212,013 B1 * | 4/2001 | Kodama et al. | 359/634 |
| 6,624,952 B2 * | 9/2003 | Kuwa et al. | 359/726 |
| 6,644,812 B2 * | 11/2003 | Kodama et al. | 353/31 |
| 6,726,334 B2 * | 4/2004 | Ishino | 353/84 |
| 6,758,565 B1 * | 7/2004 | Cobb et al. | 353/34 |
| 6,783,244 B1 * | 8/2004 | Okuyama et al. | 353/57 |
| 6,805,452 B2 * | 10/2004 | Okuyama et al. | 353/122 |
| 7,192,141 B2 * | 3/2007 | Van Den Bossche et al. | 353/33 |
| 7,347,561 B2 * | 3/2008 | Pentico et al. | 353/31 |
| 2001/0048801 A1 * | 12/2001 | Saccomanno | 385/147 |
| 2002/0163625 A1 * | 11/2002 | Tabuchi et al. | 353/31 |
| 2003/0137744 A1 * | 7/2003 | Kuwa et al. | 359/649 |
| 2003/0189693 A1 * | 10/2003 | Ishino | 353/31 |
| 2004/0017620 A1 * | 1/2004 | Kaneko et al. | 359/824 |
| 2004/0109236 A1 * | 6/2004 | Nishioka | 359/643 |
| 2005/0219430 A1 * | 10/2005 | Nagano | 349/9 |
| 2006/0291057 A1 * | 12/2006 | Fiolka et al. | 359/489 |
| 2007/0019179 A1 * | 1/2007 | Fiolka et al. | 355/71 |
| 2009/0002675 A1 * | 1/2009 | Fiolka et al. | 355/71 |
| 2009/0027623 A1 * | 1/2009 | Kawamura et al. | 353/31 |
| 2010/0045957 A1 * | 2/2010 | Fiolka et al. | 355/71 |

FOREIGN PATENT DOCUMENTS

JP 10-133303 A 5/1998

* cited by examiner

*Primary Examiner* — John Lee
(74) *Attorney, Agent, or Firm* — Lerner, David, Littenberg, Krumholz & Mentlik, LLP

(57) ABSTRACT

An optical apparatus may include spectroscope means for splitting light irradiated from a light source into multiple color rays, polarizer means for polarizing the multiple color rays split by the spectroscope means, and trimming filters each trimming a wavelength component of at least one of the multiple color rays polarized through the polarizer means and guiding the resulting ray to an optical modulator, wherein at least one of the trimming filters is sloped about an optical axis.

13 Claims, 7 Drawing Sheets

$\alpha$: INCIDENT ANGLE OF LIGHT BEAM AGAINST OPTICAL AXIS
$\beta$: SLOPE OF TRIMMING FILTER
$\alpha - \beta = \gamma$: INCIDENT ANGLE OF TRIMMING FILTER

OPTICAL APPARATUS AND PROJECTION DISPLAY SYSTEM

CROSS-REFERENCE TO RELATED APPLICATIONS

This application claims priority from Japanese Patent Application Nos. JP 2007-020612 and JP 2007-138021 filed in the Japanese Patent Office on Jan. 31, 2007 and May 24, 2007, respectively, the entire content of which is incorporated herein by reference.

BACKGROUND OF THE INVENTION

1. Field of the Invention

The present invention relates to an optical apparatus that splits light irradiated from a light source into multiple color (such as R (red), G (green) and B (blue)) rays and guides them to optical modulators respectively corresponding to the color rays and a projection display system including the optical apparatus.

2. Description of the Related Art

A projection display system such as a liquid crystal projector splits light output from a light source into three primary color rays of R (red), G (green) and B (blue), guides them to corresponding optical modulators (such as liquid crystal panels) and modulates and synthesizes them by a cross prism through predetermined paths for the colors and then enlarges and projects the synthesis result on a screen through a projection optical system (refer to JP-A-10-133303 (Patent Document 1), for example).

SUMMARY OF THE INVENTION

However, in the projection display system, the in-panel color uniformity of projected pictures may decrease, which may differentiate the shades among places without the uniformity of the balance of quantity of light of the colors in modulating and synthesizing the light rays corresponding to the three primary colors of R, G and B by an optical modulator.

The decrease in in-panel color uniformity may be caused by the angle dependency of wavelengths on a lens or a mirror, for example. Accordingly, the invention disclosed in Patent Document 1 inserts a color purity correction filter at a predetermined angle on an optical path to perform color purity correction by using the angle dependency of the color purity correction filter. However, an enough space may be required for the insertion of a color purity correction filter on an optical path, which may be disadvantageous in that it may not contribute to the decrease in size of the optical unit. Alternatively, the angle dependency may be suppressed by a sloping film on a dichroic mirror, but forming the sloping film is difficult.

According to an embodiment of the present invention, there is provided an optical apparatus which may include spectroscope means for splitting light irradiated from a light source into multiple color rays, polarizer means for polarizing the multiple color rays split by the spectroscope means, and trimming filters each trimming a wavelength component of at least one of the multiple color rays polarized through the polarizer means and guiding the resulting ray to an optical modulator, wherein at least one of the trimming filters may be sloped about an optical axis.

More specifically, the light irradiated from a light source may be split into R (red), G (green) and B (blue) rays by the spectroscope means, and a trimming filter may be provided corresponding for at least one of the RGB rays. Then, at least one of the trimming filters may be sloped about an optical axis.

In particular, the direction and angle of the slope of the trimming filter about the optical axis may be defined at the direction and angle that produce a more even in-plane wavelength distribution of the light after the modulation by the optical modulator.

According to this embodiment of the invention, the incident angle dependency on the front lens and/or mirror may be inversely corrected by using the incident angle dependency of the trimming filter that guides polarized light from the polarizer means to the optical modulator.

Furthermore, defining the G (green) ray of the R, G and B color rays for a relay lens system may increase the optical path length of the G-ray with a higher angle dependency of the color difference. Therefore, a higher inverse correction effect may be obtained by increasing the angle of the trimming filter corresponding to the G-ray.

The term "relay lens system" here may refer to an optical system having the longest optical path among optical paths from the starting point of the split of light input from a light source to an optical modulator corresponding to each color in the spectroscope means.

According to another embodiment of the invention, there is provided a projection display system which may include a light source, an optical apparatus that splits light irradiated from the light source into multiple color rays and guides them to optical modulators corresponding to the multiple color rays, synthesizing means for synthesizing the rays guided from the optical apparatus to the optical modulators corresponding to the color rays and modulated by the optical modulators, and a projection optical system that projects the light synthesized by the synthesizing means, wherein the optical apparatus has spectroscope means for splitting light irradiated from the light source into multiple color rays, polarizer means for polarizing the multiple color rays split by the spectroscope means, and trimming filters each trimming a wavelength component of at least one of the multiple color rays polarized through the polarizer means and guiding the resulting ray to an optical modulator, in which at least one of the trimming filters is sloped about an optical axis.

According to this embodiment of the invention, the incident angle dependency on the front lens and/or mirror may be inversely corrected by using the incident angle dependency of the trimming filter that guides polarized light from the polarizer means to the optical modulator.

According to this embodiment of the invention, the trimming filter may be held such that multiple angles of the slope can be defined about an optical axis. For example, the trimming filter may be held by a sheet metal or a spring such that the angles such as 0° and 10° or 0° and 14° can be switched and defined. Thus, the angle can be defined and fixed accurately and easily with a click feeling at each of the angles.

Therefore, the in-panel color uniformity of pictures may be improved without the necessity for a sloped film in a dichroic mirror and without the necessity for an additional color purity correction filter within an optical path. As a result, the optical apparatus and the projection display system including it can be decreased in size and increased in image quality.

DETAILED DESCRIPTION

An embodiment of the invention will be described below in detail with reference to drawings.

Figure 1:
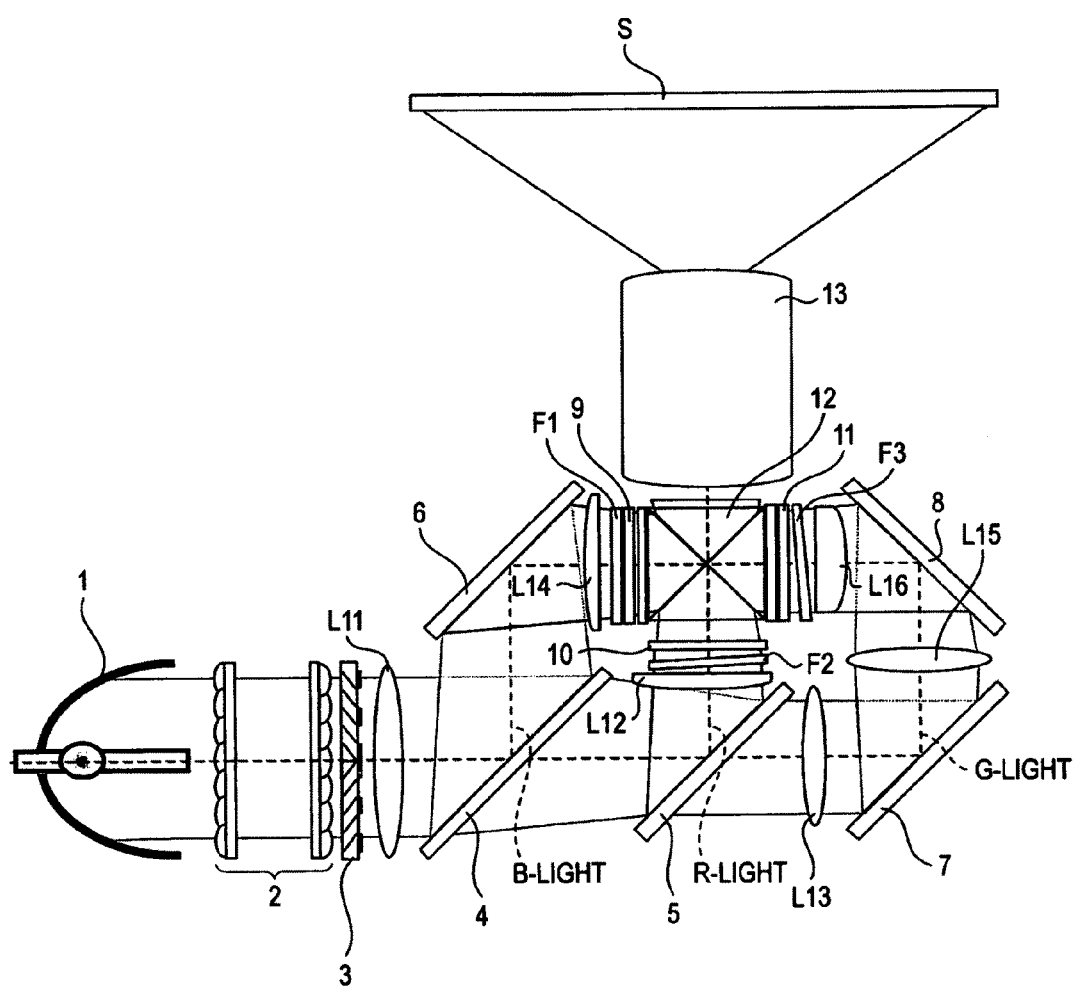
FIG. 1 is a diagram showing an example of the optical configuration of a projection display system (three-chip liquid crystal projector) to which an optical apparatus according to an embodiment of the invention is applied.
Figure 2:
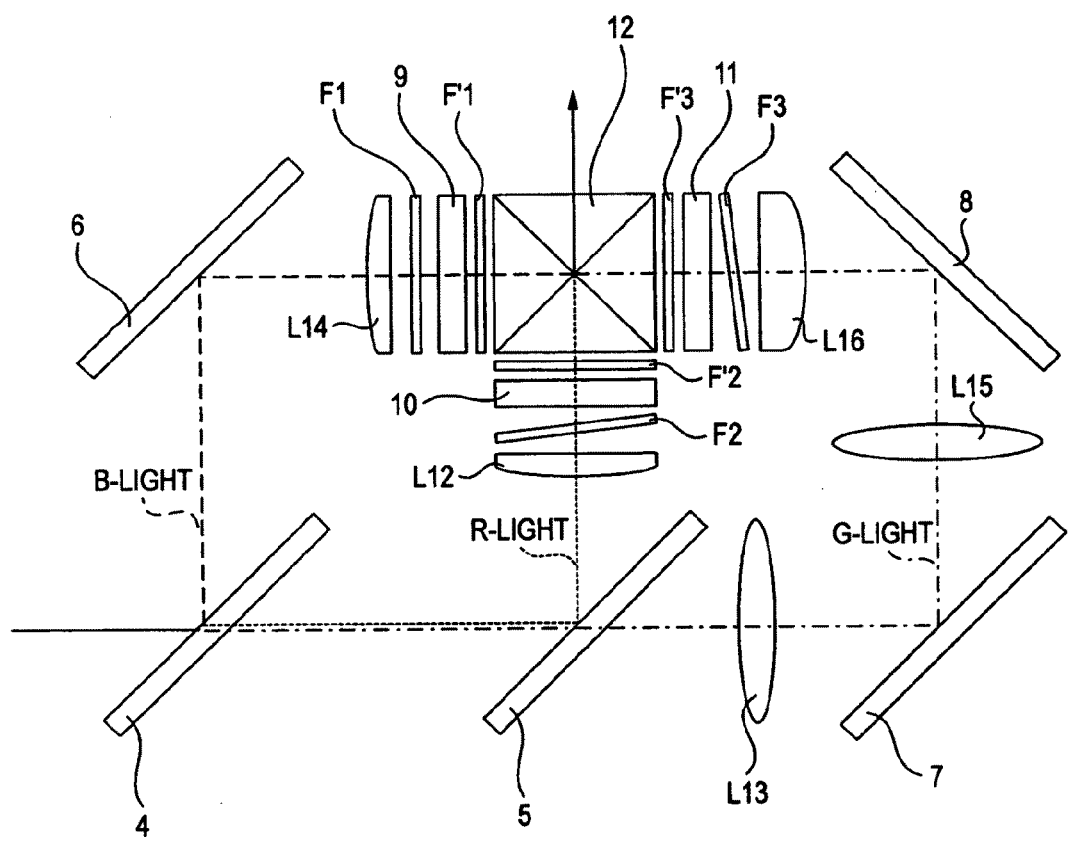
FIG. 2 is a diagram showing a configuration of the optical apparatus according to an embodiment of the invention.

FIG. 1 is a diagram showing an example of the optical configuration of a projection display system (three-chip liquid crystal projector) to which an optical apparatus according to an embodiment of the invention is applied. FIG. 2 is a diagram showing a configuration of the optical apparatus according to an embodiment of the invention. That is, an optical apparatus according to an embodiment is applied to a three-chip liquid crystal projector as shown in FIG. 1, and the configuration shown in FIG. 2 constitutes the principal part.

In FIG. 1, a three-chip liquid crystal projector includes a light source 1, an optical integrator 2, a PS converter 3, LCDs 9 to 11, a cross prism 12 and a projection lens 13, in addition to the optical apparatus according to an embodiment shown in FIG. 2.

In the three-chip liquid crystal projector, the pencils of light emitted from the light source 1 are collimated by a lens system, not shown. The pencils of light in the area excluding the visible light region are blocked by a UV-IR cut filter and enter the optical integrator 2. The optical integrator 2 forms a multi-light source having multiple light source images based on the pencils of light from the light source 1.

The direction of polarization of the pencils of light from the multi-light source formed by the optical integrator 2 is defined by the PS converter 3, and the pencils of light enter the optical apparatus according to the embodiment of the invention through a condenser lens L11.

The optical apparatus splits the light irradiated from a light source into three primary color rays of RGB and guides the color rays to three optical modulators (such as liquid crystal display elements (LCDs) 9 to 11) corresponding to the colors. In particular, according to this embodiment, at least one of trimming filters F1 to F3 trimming the wavelength components of RGB rays of the light irradiated from the light source 1 in a predetermined range and guiding the rays to the LCDs 9 to 11 respectively is placed in a sloped manner about the optical axis.

The optical apparatus includes a dichroic mirror 4, a dichroic mirror 5, a mirror 6, mirrors 7 and 8, condenser lenses L12, L14 and L16, relay lenses L13 and L15, a trimming filter F1, a trimming filter F2, a trimming filter F3, an output side polarizer F'1, an output side polarizer F'2, and an output side polarizer F'3. The dichroic mirror 4 reflects the pencils of light in the wavelength range of B (blue). The dichroic mirror 5 reflects the pencils of light in the wavelength range of R (red). The mirror 6 reflects the pencils of light in the wavelength range of B (blue). The mirrors 7 and 8 reflect the pencils of light in the wavelength range of G (green). The condenser lenses L12, L14 and L16 and relay lenses L13 and L15 collect the pencils of light of the color rays to corresponding LCDs 9 to 11. The trimming filter F1 trims the B (blue) ray to be guided from the condenser lens L14 to the LCD 9. The trimming filter F2 trims the R (red) ray to be guided from the condenser lens L12 to the LCD 10. The trimming filter F3 trims the G (green) ray to be guided from the condenser lens L16 to the LCD 11. The output side polarizer F'1 is placed between the LCD 9 and the cross prism 12. The output side polarizer F'2 is placed between the LCD 10 and the cross prism 12. The output side polarizer F'3 is placed between the LCD 11 and the cross prism 12.

The trimming filters F1 to F3 are provided on one side (condenser lens side) of a glass plate, not shown in FIG. 2. An input side polarizer is provided on the other side (LCD side) of the glass plate. Thus, the trimming filter and the input side polarizer are provided as one part.

In this optical apparatus, the light through the condenser lens L11 first enters the dichroic mirror 4. The dichroic mirror 4 reflects the pencils of light in the wavelength range of B (blue) and allows the pencils of light in other wavelength ranges to pass through. The pencils of light in the wavelength range of B (blue), which have been reflected by the dichroic mirror 4, go to the reflection mirror 6 and illuminate in an overlapped manner the LCD 9 placed on the irradiated plane through the condenser lens L14.

The pencils of light having passed through the dichroic mirror 4 enter the dichroic mirror 5. The dichroic mirror 5 reflects the pencils of light in the wavelength range of R (red) and allows the pencils of light in other wavelength ranges to pass through. The pencils of light in the wavelength range of R (red), which have been reflected by the dichroic mirror 5, illuminate in an overlapped manner the LCD 10 placed on the irradiated plane through the condenser lens L12.

The pencils of light in the wavelength range of G (green), which have passed through the dichroic mirror 5, pass through the relay lens L13, go to the reflection mirror 7, relay lens L15, and reflection mirror 8 and illuminate in an overlapped manner the LCD 11 placed on the irradiated plane through the condenser lens L16. The condenser optical system that illuminates the LCDs 9 to 11 has an entrance pupil plane in a conjugate relationship with the entrance pupil plane of the projection lens 13.

The LCD 9, LCD 10 and LCD 11 modulate the pencils of light in the wavelength ranges of B (blue), R (red) and G (green) according to the video signals of the respective colors. The pencils of light in the wavelength ranges of B (blue), R (red) and G (green) modulated by the LCDs 9 to 11 are superimposed again by the cross prism 12 functioning as synthesizing means, then enter the projection lens 13 and are enlarged and projected onto a screen S.

In this configuration, the dichroic mirror 4 reflects the pencils of light in the wavelength range of B (blue), and the dichroic mirror 5 reflects the pencils of light in the wavelength range of R (red). Conversely, the dichroic mirror 4 may reflect the pencils of light in the wavelength range of R (red), and the dichroic mirror 5 may reflect the pencils of light in the wavelength range of B (blue). Having described that the G (green) ray is defined to the relay lens system (which is the optical system having the longest optical path among the optical paths from the starting point of the light split by the dichroic mirror 4 functioning as spectroscope means to the LCDs 9 to 11 corresponding to the colors), the rays other than the G (green) ray may be defined to the relay lens system.

In the configuration of this optical apparatus, this embodiment has a feature that at least one of the trimming filters F1 to F3 corresponding to the R, G and B rays is sloped about an optical axis, which can increase the in-panel color uniformity of projected pictures.

In the example shown in FIGS. 1 and 2 the trimming filters F2 and F3 corresponding to the G and R rays slope about the optical axis, however, the trimming filter F1 corresponding to the B-ray may be sloped or any one or two of the trimming filters corresponding to the RGB rays may be sloped, as necessary.

Providing the trimming filter or filters with an angle about an optical axis is for inversely correcting the incident angle dependency of the front lens or mirror by using the incident angle dependency of the wavelength characteristics of the trimming filters. Thus, the necessity for a sloping film on the dichroic mirrors or for an additional color purity correction filter within an optical path can be eliminated, and the in-panel color uniformity of projected pictures can be increased.

A space for ventilation for preventing the heat generation by the LCDs 9 to 11 and the trimming filters F1 to F3 is provided around the trimming filters F1 to F3, for example, between the trimming filters F1 to F3 and the condenser lenses L12, L14 and L16 or LCDs 9 to 11. Therefore, the space can be used as the space for sloping the trimming filters F1 to F3.

Figure 3A:
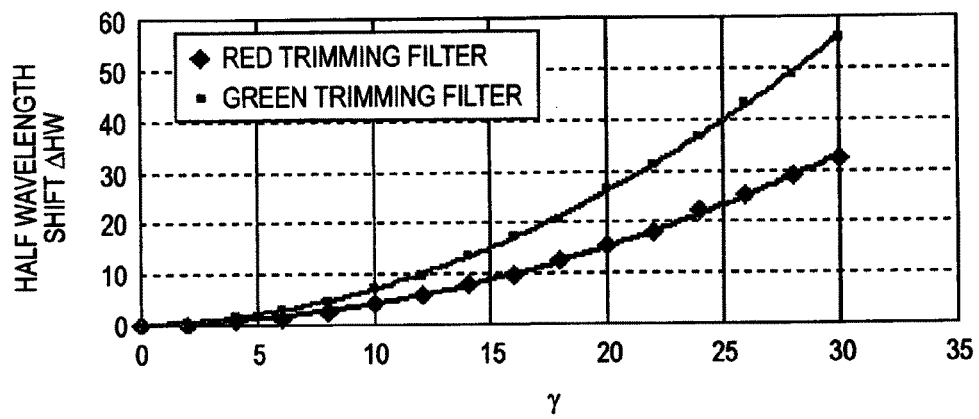
FIGS. 3A and 3B are diagrams showing half-value wavelength travels ΔHW against the incident angles γ of light onto trimming filters.
Figure 3B:
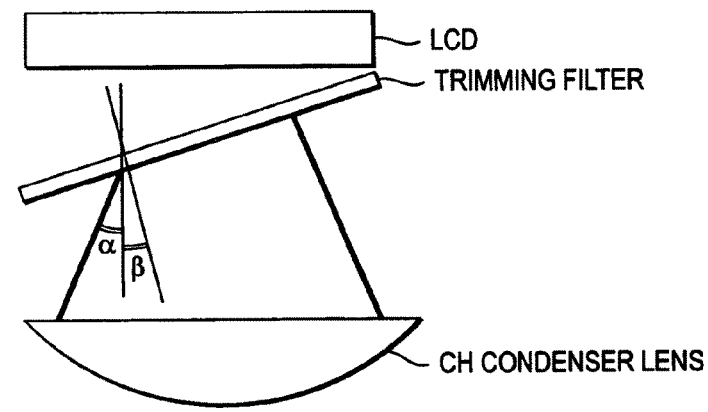

Next, the incident angle dependency of the wavelength characteristics of the trimming filters will be described. FIGS. 3A and 3B are diagrams showing half-value wavelength travels ΔHW against the incident angles γ of light on trimming filters and show R (red) and G (green) rays having higher angle dependencies. Here, the incident angle γ of the light to a trimming filter is the sum of a light beam incident angle α on an optical axis in a case where the trimming filter is sloped about the optical axis and the slope β of the trimming filter about the optical axis, as shown in FIG. 3B.

While FIG. 3B highlights the incident angle of the light beam and the slope of the trimming filter, the incident angle increases as the distance from the optical axis increases generally in the pencils of light transmitted from an optical system to the trimming filter through the last condenser lens. Then, as shown in FIG. 3A, the difference in wavelength (half-value wavelength) increases as the incident angle γ of the light beam onto the trimming filter increases.

Figure 4A:
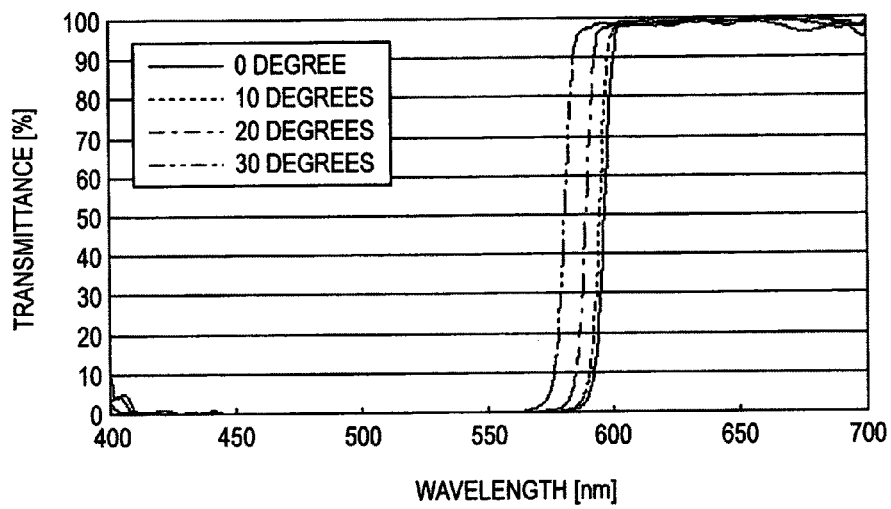
FIGS. 4A and 4B are diagrams showing the quantity of light against the wavelength with the slope about the optical axis of a trimming filter as a parameter.
Figure 4B:
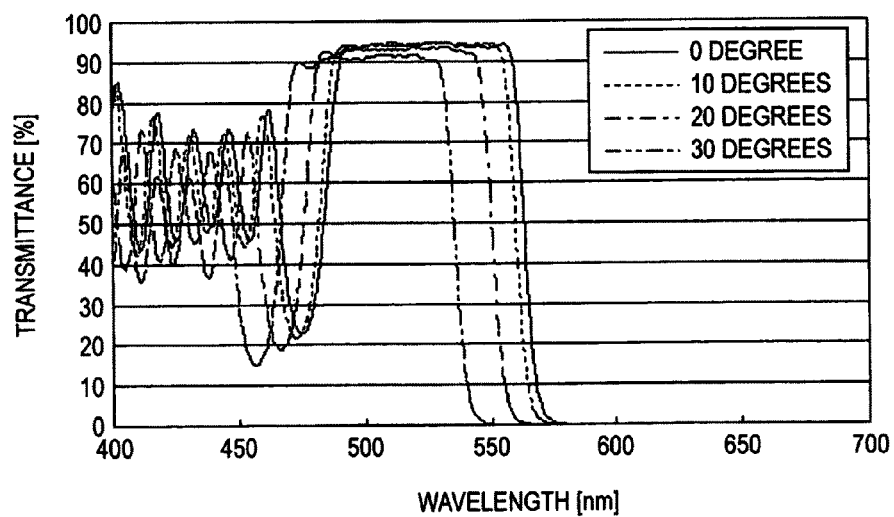

FIGS. 4A and 4B are diagrams showing the quantity of light against the wavelength with the slope about the optical axis of a trimming filter as a parameter. FIG. 4A shows an example of the trimming filter corresponding to the R (red) ray, and FIG. 4B shows an example of the trimming filter corresponding to the G (green) ray. In both examples, when the slope of the trimming filter increase, the filter characteristics shift to the short wavelength side.

Here, in a case where the trimming filters are placed without any sloping about the optical axis, the incident angle of a light beam changes depending on the position in the plane of the trimming filter due to the characteristic of the optical system as described above. This significantly occurs particularly in a case of a longer optical path length such as that of a relay lens system.

In particular, in a case where the G (green) ray with a higher incident angle dependency of light beam on the trimming filter is defined to the relay lens system, the optical path length is longer than those for the lens system for other colors. Therefore, the change in incident angle in the plane of the trimming filter becomes highly significant. The change in incident angle causes the variation in wavelength characteristic in the plane of the trimming filter, which then causes the in-plane variation in shades of projected pictures due to the adverse effect such as the white balance.

Accordingly, in this embodiment, the trimming filter is sloped to suppress the variation in image quality due to the wavelength shift caused by the in-plane angle change of incident light due to the characteristic of the optical system by using the shift of the wavelength depending on the slope about the optical axis of the trimming filter (refer to FIGS. 4A and 4B).

In other words, sloping the trimming filter or filters about the optical axis changes the distribution of the incident angle in the plane of incident light though the difference in in-plane incident angle of incident light still exists. Thus, in relation with the synthesis balance with other colors, the in-panel color uniformity of projected pictures can be improved.

The direction and angle of the slope of the trimming filter or filters about the optical axis are defined according to the optical set since the direction and angle of the slope depend on the light source 1 or optical systems. Therefore, in some cases, the trimming filter or filters may be sloped in one of the x and y directions, which are orthogonal to the optical axis, z direction, or may be sloped in both directions.

FIGS. 5A to 6B are schematic section diagrams illustrating sloping mechanisms of a trimming filter. Showing the trimming filter F2 corresponding to the R (red) ray, for example, in FIGS. 5A to 6B, the sloping mechanism is also applicable to trimming filters corresponding to other colors.

Figure 5A:
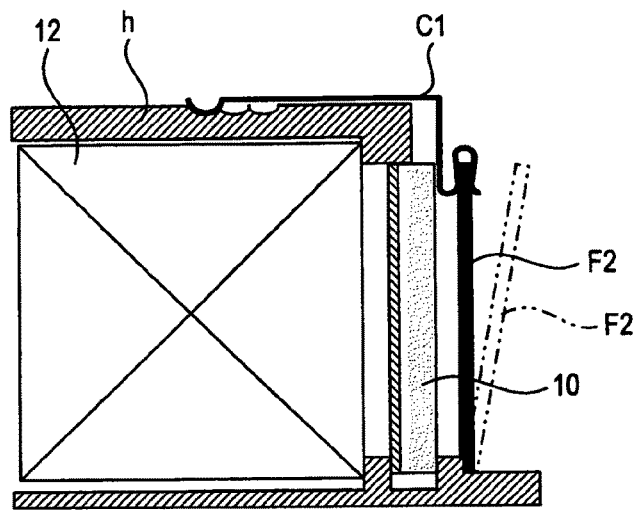
FIGS. 5A and 5B are schematic diagrams illustrating an example (#1) of the sloping mechanism of a transistor.
Figure 5B:
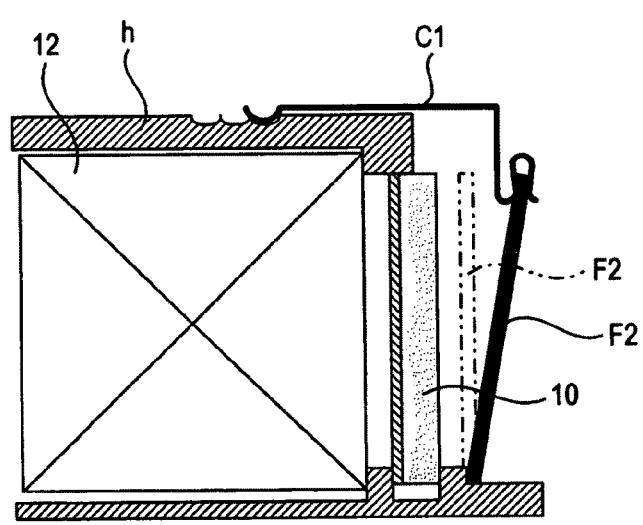

The sloping mechanism shown in FIGS. 5A and 5B fixes one end of the trimming filter F2 with a clip C1 of a sheet metal, and the movement of the clip C1 slopes the trimming filter F2 by using the other end as the axis of the slope. The example shown in FIG. 5A is a case where the slope of the trimming filter F2 is 0° (orthogonal to the optical axis). The leading end of the clip C1 has a convex, and a holder h has multiple concaves corresponding to the convex. The clip C1 has a spring property, which brings the convex of the clip C1 into engagement with one of the concaves of the holder h, and fixes the position of the clip C1. The angle of the trimming filter F2 is defined based on the position of the clip C1.

The example shown in FIG. 5B is a case where the slope of the trimming filter F2 is about 10°. Sloping the trimming filter F2 from the state shown in FIG. 5A by using the lower end in the figure as the axis moves the clip C1 holding the trimming filter F2 in the horizontal direction in the figure. Thus, the convex of the clip C1 fits into another concave of the holder h. When the convex of the clip C1 fits into the adjacent concave from one concave of the holder h, the trimming filter F2 is fixed at the position with clicking feeling. Thus, the fixation defines the angle of the trimming filter F2. Therefore, providing the holder h with multiple concaves allows the adjustment of the angle of the trimming filter F2 corresponding to the positions of the concaves.

Figure 6A:
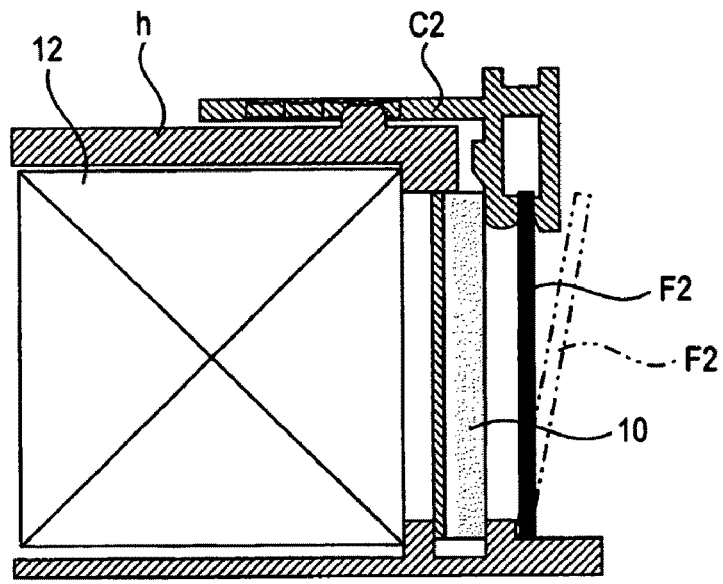
FIGS. 6A and 6B are schematic diagrams illustrating an example (#2) of the sloping mechanism of a transistor.
Figure 6B:
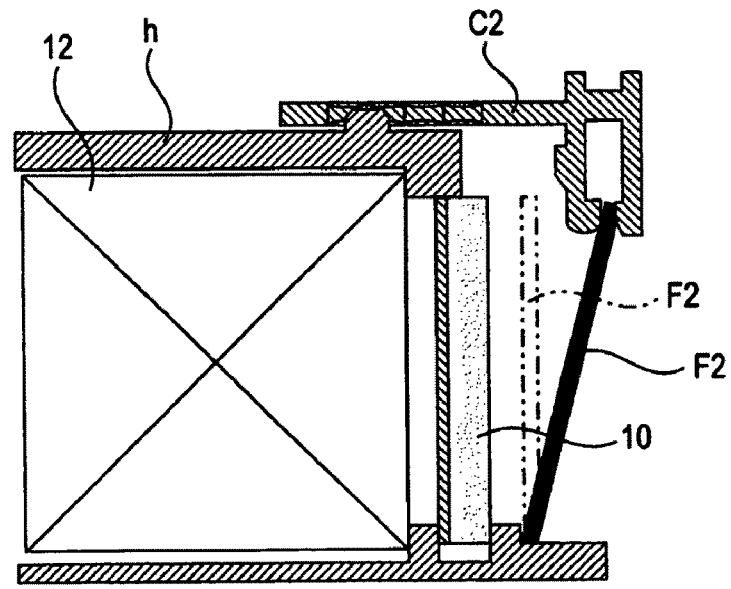

The sloping mechanism shown in FIGS. 6A and 6B fixes one end of the trimming filter F2 with a clip C2 of a resin, and the movement of the clip C2 slopes the trimming filter F2 by using the other end as the axis of the slope. The example shown in FIG. 6A is a case where the slope of the trimming filter F2 is 0° (orthogonal to the optical axis). One side of the clip C2 has multiple convexes and concaves, and a holder h has projections to be brought into contact with the concaves and convexes. One concave of the convexes and concaves of the clip C2 fits into the projection of the holder h so that the position of the clip C2 can be fixed. Thus, the angle of the trimming filter F2 can be defined.

The example shown in FIG. 6B is a case where the slope of the trimming filter F2 is about 14°. Sloping the trimming filter F2 from the state shown in FIG. 6A by using the lower end in the figure as the axis moves the clip C2 holding the trimming filter F2 in the horizontal direction in the figure. Thus, a projection of the holder h fits into the concave on the side of the clip C2. When the clip C2 moves and the projection of the holder h enters from one concave into the adjacent concave of the holder h, the trimming filter F2 is fixed at the position with clicking feeling. Thus, the fixation defines the angle of the trimming filter F2. Therefore, multiple convexes and concaves of the clip C2 allow the adjustment of the angle of the trimming filter F2 corresponding to the positions of the concaves.

In both cases, the angle of the trimming filter F2 can be adjusted by the simple operation, and the angle can be securely fixed with clicking feeling. The definition of the angle of the trimming filter F2 can improve the in-panel color uniformity of projected pictures as described above. The function allowing the adjustment of multiple angles can alleviate the half-value specifications of the usable trimming filter F2, which may increase the number of usable filters. Therefore, the yield of the filters can be improved, and the costs of the products can be decreased.

Figure 7:
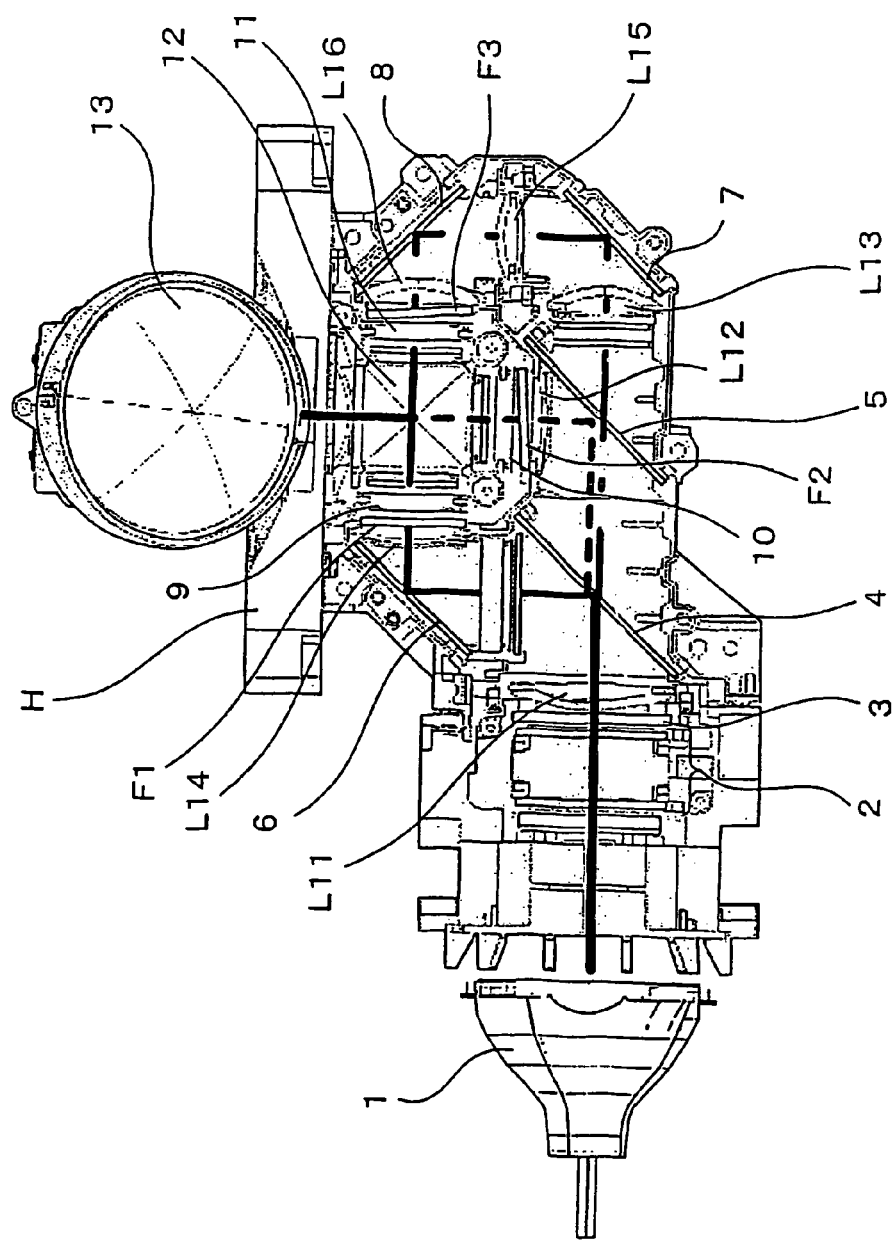
FIG. 7 is a schematic diagram showing an example of the unit configuration of a three-chip liquid crystal projector including an optical apparatus according to an embodiment of the invention.

FIG. 7 is a schematic diagram showing an example of the unit configuration of a three-chip liquid crystal projector including an optical apparatus according to an embodiment of the invention. The unit configuration includes as a unit (which is one united member) the optical parts after the light source 1 and before the projection lens 13 of the three-chip liquid crystal projector as described above.

That is, the unit includes, in one package, the optical integrator 2, the PS converter 3, the optical apparatus (including the dichroic mirrors 4 and 5, the mirrors 6, 7 and 8, the condenser lenses L12, L14 and L16, the relay lenses L13 and L15, and the trimming filters F1 to F3) according to the embodiment of the invention, the LCDs 9 to 11 and the cross prism 12, in which the positioning of the optical parts have been completed.

Therefore, a display system can be built easily by attaching the light source 1 and the projection lens 13 to the unit in the configuration of the three-chip liquid crystal projector. For example, the optical axes of the unit and the projection lens 13 can be defined only by attaching the unit to a housing H containing the projection lens 13. A three-chip liquid crystal projector can be configured by placing the light source 1 into a cabinet (not shown) of the system.

In the unit, the slope of one of the trimming filters F1 to F3 as described above about an optical axis can be defined in a fixed manner with the attachment structure of the trimming filters F1 to F3 within the cabinet of the unit. In other words, a designed slope can be achieved only by fixing the trimming filters F1 to F3 to the attachment frame on the unit cabinet.

The slopes of the trimming filters F1 to F3 about the optical axis can be adjusted. For example, by providing a mechanism that allows the adjustment of the attachment angles of the trimming filters F1 to F3 to the unit cabinet, the angles of the trimming filters F1 to F3 corresponding to the change in the light source 1, for example, can be adjusted easily.

A display system including the light source 1 and the projection lens 13, which are intended by a designer, can be built with the unit configuration, and a part can be easily replaced if necessary.

The invention is applied to a front liquid crystal projector that projects pictures on to the front of a screen S in the examples described above. However, the invention is not limited thereto but is applicable to any image display systems having a condenser optical system that illuminates a modulator, such as a rear liquid crystal projector that projects video on to the back of a screen S, the video of which can be viewed from the front, and a projector including other modulators than an LCD (such as a DMD (Digital Micromirror Device) or a GLV (Grating Light Valve)).

Having described the embodiment in which the trimming filters in the optical apparatus are provided for all of R (red), G (green) and B (blue) rays, a trimming filter may be provided for at least one of RGB rays, and one of the provided trimming filters may be sloped about the optical axis to provide the operational effects of the invention.

For example, the trimming filter F1 corresponding to the B (blue) ray is not necessary in a case where the light split and the precise determination of color purity of B (blue) can be performed by the dichroic mirror 4. In this case, a sapphire glass substrate (having an incident side polarizer on one side) is provided instead of the trimming filter F1. Thus, the cooling effect of the incident side polarizer can be improved.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical apparatus comprising:
spectroscope means for splitting light irradiated from a light source into multiple color rays;
condensing means for condensing the multiple color rays split by the spectroscope means; and
trimming filters each trimming a wavelength component of at least one of the multiple color rays condensed through the condensing means and guiding the resulting ray to an optical modulator
wherein a space is provided around each trimming filter for purposes of venting heat and allowing the trimming filter to be sloped,
wherein each trimming filter is provided on one side, a condensing means side, of a glass plate and an input polarizer is provided on the other side, a liquid crystal display side, of the glass plate such that the trimming filter and the input side polarizer are provided as one part, and
wherein each of the trimming filters is sloped in both of two directions that are orthogonal to an optical axis.

2. The optical apparatus according to claim 1, wherein the multiple color rays split by the spectroscope means are R (red), G (green) and B (blue) rays.

3. The optical apparatus according to claim 1, wherein:
the multiple color rays split by the spectroscope means are R (red), G (green) and B (blue) rays; and
the trimming filters are provided correspondingly for the R (red) and G (green) rays out of the multiple color rays.

4. The optical apparatus according to claim 1, wherein the direction and angle of the slope of the trimming filter about the optical axis are defined so as to produce a more uniform in-panel wavelength distribution of the light after modulation by the optical modulator.

5. The optical apparatus according to claim 1, wherein the multiple color rays split by the spectroscope means are R (red), G (green) and B (blue) rays; and
the ray corresponding to G (green) out of the multiple color rays is input to a relay lens system.

6. A projection display system comprising:
a light source;
an optical apparatus that splits light irradiated from the light source into multiple color rays and guides them to optical modulators corresponding to the multiple color rays;

synthesizing means for synthesizing the rays guided from the optical apparatus to the optical modulators corresponding to the color rays and modulated by the optical modulators; and a projection optical system that projects the light synthesized by the synthesizing means, wherein the optical apparatus has:

spectroscope means for splitting light irradiated from the light source into multiple color rays;

condensing means for condensing the multiple color rays split by the spectroscope means; and trimming filters each trimming a wavelength component of at least one of the multiple color rays condensed through the condensing means and guiding the resulting ray to an optical modulator wherein a space is provided around each trimming filter for purposes of venting heat and allowing the trimming filter to be sloped, wherein each trimming filter is provided on one side, a condensing means side, of a glass plate and an input polarizer is provided on the other side, a liquid crystal display side, of the glass plate such that the trimming filter and the input side polarizer are provided as one part, and wherein each of the trimming filters is sloped in both of two directions that are orthogonal to an optical axis.

7. The projection display system according to claim 6, wherein:
the multiple color rays split by the spectroscope means are R (red), G (green) and B (blue) rays; and
the trimming filters are provided correspondingly for the R (red) and G (green) rays out of the multiple color rays.

8. The projection display system according to claim 6, wherein:
the light source is a high pressure mercury vapor lamp; and
light is split into R (red), G (green) and B (blue) rays by the spectroscope means, and the trimming filter corresponding to the R (red) ray and the trimming filter corresponding to the G (green) ray are sloped about the optical axis.

9. The projection display system according to claim 6, wherein:
the light source is a high pressure mercury vapor lamp; and
light is split into R (red), G (green) and B (blue) rays by the spectroscope means, and the light corresponding to the G (green) I ray is input to a relay lens system.

10. The optical apparatus according to claim 1, wherein the trimming filters are held such that multiple angles can be defined to be sloped about the optical axis.

11. The projection display system according to claim 6, wherein the trimming filters are held such that multiple angles can be defined to be sloped about the optical axis.

12. An optical apparatus comprising:
a spectroscope splitting light irradiated from a light source into multiple color rays;
a condenser condensing the multiple color rays split by the spectroscope; and
trimming filters each trimming a wavelength component of at least one of the multiple color rays condensed through the condenser and guiding the resulting ray to an optical modulator
wherein a space is provided around each trimming filter for purposes of venting heat and allowing the trimming filter to be sloped,
wherein each trimming filter is provided on one side, a condenser side, of a glass plate and an input polarizer is provided on the other side, a liquid crystal display side, of the glass plate such that the trimming filter and the input side polarizer are provided as one part, and
wherein each of the trimming filters is sloped in both of two directions that are orthogonal to an optical axis.

13. A projection display system comprising:
a light source;
an optical apparatus that splits light irradiated from the light source into multiple color rays and guides them to optical modulators corresponding to the multiple color rays;
a synthesizing section synthesizing the rays guided from the optical apparatus to the optical modulators corresponding to the color rays and modulated by the optical modulators; and
a projection optical system that projects the light synthesized by the synthesizing section,
wherein the optical apparatus has:
a spectroscope splitting light irradiated from the light source into multiple color rays;
a condenser condensing the multiple color rays split by the spectroscope; and
trimming filters each trimming a wavelength component of at least one of the multiple color rays condensed through the condenser and guiding the resulting ray to an optical modulatory
wherein a space is provided around each trimming filter for purposes of venting heat and allowing the trimming filter to be sloped,
wherein each trimming filter is provided on one side, a condenser side, of a glass plate and an input polarizer is provided on the other side, a liquid crystal display side, of the glass plate such that the trimming filter and the input side polarizer are provided as one part, and
wherein each of the trimming filters is sloped in both of two directions that are orthogonal to an optical axis.

* * * * *